Sept. 18, 1951  C. H. SCOTT  2,567,974
POWER TRANSMISSION AND STROKE ADJUSTOR MECHANISM
Filed March 2, 1946  6 Sheets-Sheet 1

INVENTOR:
CHARLES H. SCOTT,
BY
Antonie Middleton
ATTORNEY

Sept. 18, 1951     C. H. SCOTT     2,567,974
POWER TRANSMISSION AND STROKE ADJUSTOR MECHANISM
Filed March 2, 1946     6 Sheets-Sheet 2
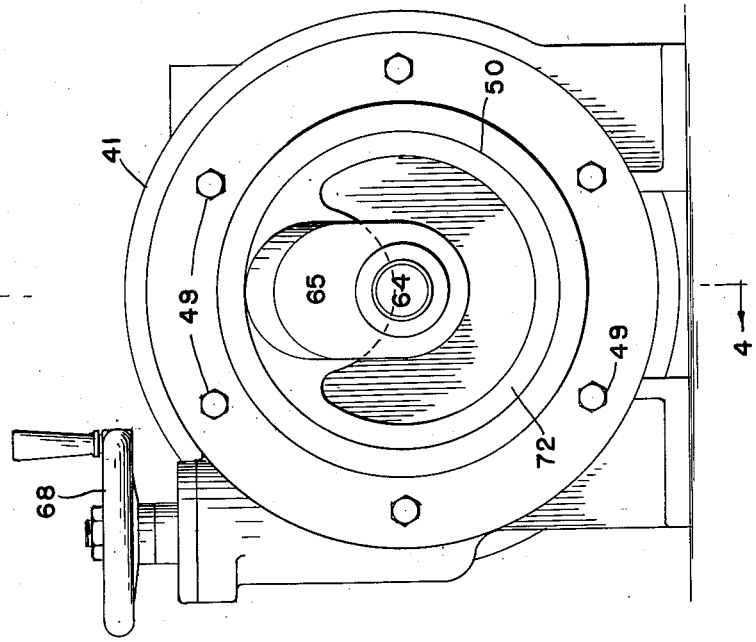
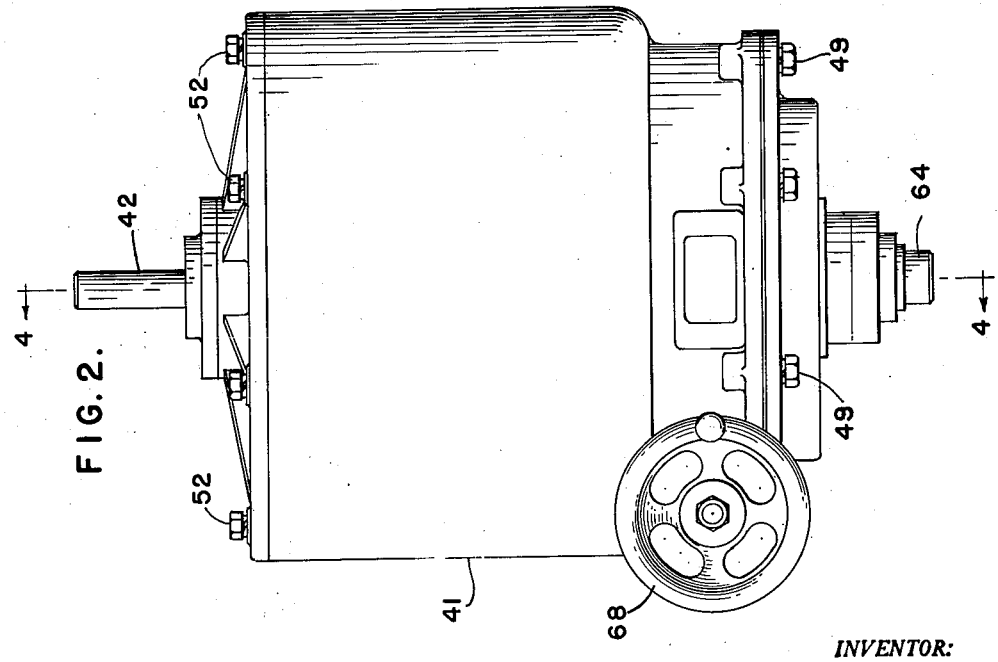
*INVENTOR:*
CHARLES H. SCOTT,
BY Arthur Middleton
ATTORNEY

INVENTOR:
CHARLES H. SCOTT,
BY
ATTORNEY

Sept. 18, 1951  C. H. SCOTT  2,567,974
POWER TRANSMISSION AND STROKE ADJUSTOR MECHANISM
Filed March 2, 1946  6 Sheets-Sheet 4

INVENTOR:
CHARLES H. SCOTT,
BY Autumn Middleton
ATTORNEY

Sept. 18, 1951     C. H. SCOTT     2,567,974
POWER TRANSMISSION AND STROKE ADJUSTOR MECHANISM
Filed March 2, 1946     6 Sheets-Sheet 5

INVENTOR:
CHARLES H. SCOTT,
BY
ATTORNEY

Sept. 18, 1951     C. H. SCOTT     2,567,974
POWER TRANSMISSION AND STROKE ADJUSTOR MECHANISM
Filed March 2, 1946     6 Sheets-Sheet 6

*INVENTOR:*
CHARLES H. SCOTT,
BY
*Autumn Middleton*
ATTORNEY

Patented Sept. 18, 1951

2,567,974

UNITED STATES PATENT OFFICE 2,567,974

POWER TRANSMISSION AND STROKE ADJUSTOR MECHANISM

Charles H. Scott, Summit, N. J., assignor to The Dorr Company, Stamford, Conn., a corporation of Delaware Application March 2, 1946, Serial No. 651,454

8 Claims. (Cl. 74—600)

1

This invention relates to power transmission mechanism for converting rotary motion into reciprocating motion. The object thereof is to provide a construction which is relatively strong, compact and flexible in operation, wherein the forces of certain movable heavy load carrying parts or power transmission members of the mechanism are advantageously taken care of, and wherein the gearing essential to the operation of the mechanism is substantially protected against detrimental effects of outside elements or substances.

Some features or aspects of the invention revolve about the assemblage of parts whereby the load requirements are advantageously met.

Other features or aspects of the invention revolve about the arrangement of parts whereby the effective length of movement of an actuated reciprocable or reciprocating member can be readily adjusted and attained at the will of an operator and all of this while the mechanism is in operation.

The invention hereof has been designed for use in a pump operating mechanism, but it is to be understood that the mechanism embodying the invention hereof is capable of general use or application and is not necessarily limited to employment or embodiment in a pump operating mechanism. In fact, while the invention hereof is applicable for advantageous use in light machinery, it is peculiarly adaptable in heavy machinery or equipment where heavy operating loads are encountered.

Certain features of the invention have been designed for realizing advantages and use in the power transmission mechanism of the general class referred to whereby it is possible during the operation of the mechanism for an operator to make progressive stroke adjustment of the reciprocatable member or element actuated thereby or for making a refined adjustment for a particular operation.

Further objects and advantages of the invention will be appreciated from the description appearing in the specification hereof, and will be further apparent in connection with the accompanying drawings constituting a part of this specification.

In said drawings:

Fig. 1 shows in assembled relationship a pump equipped with reciprocatable linkage mechanism for actuating movable pumping elements of the pump, a motor and a novel power transmission mechanism having a rotatable shaft driven from the rotor of the motor and a selectively positionable crankshaft of which the crank is connected to the linkage mechanism whereby according to the selected bodily position of the shaft a selected degree of reciprocating motion is imparted to the linkage mechanism.

Figs. 2, 3 and 4 are respectively a plan view, a front elevational view and a vertical longitudinal sectional view of the power transmission mechanism shown in Fig. 1. Said Fig. 4 is a vertical longitudinal sectional view taken as on a vertical plane indicated by line 4—4 of Figs. 2 and 3 looking in the direction of the arrows.

Figure 1:
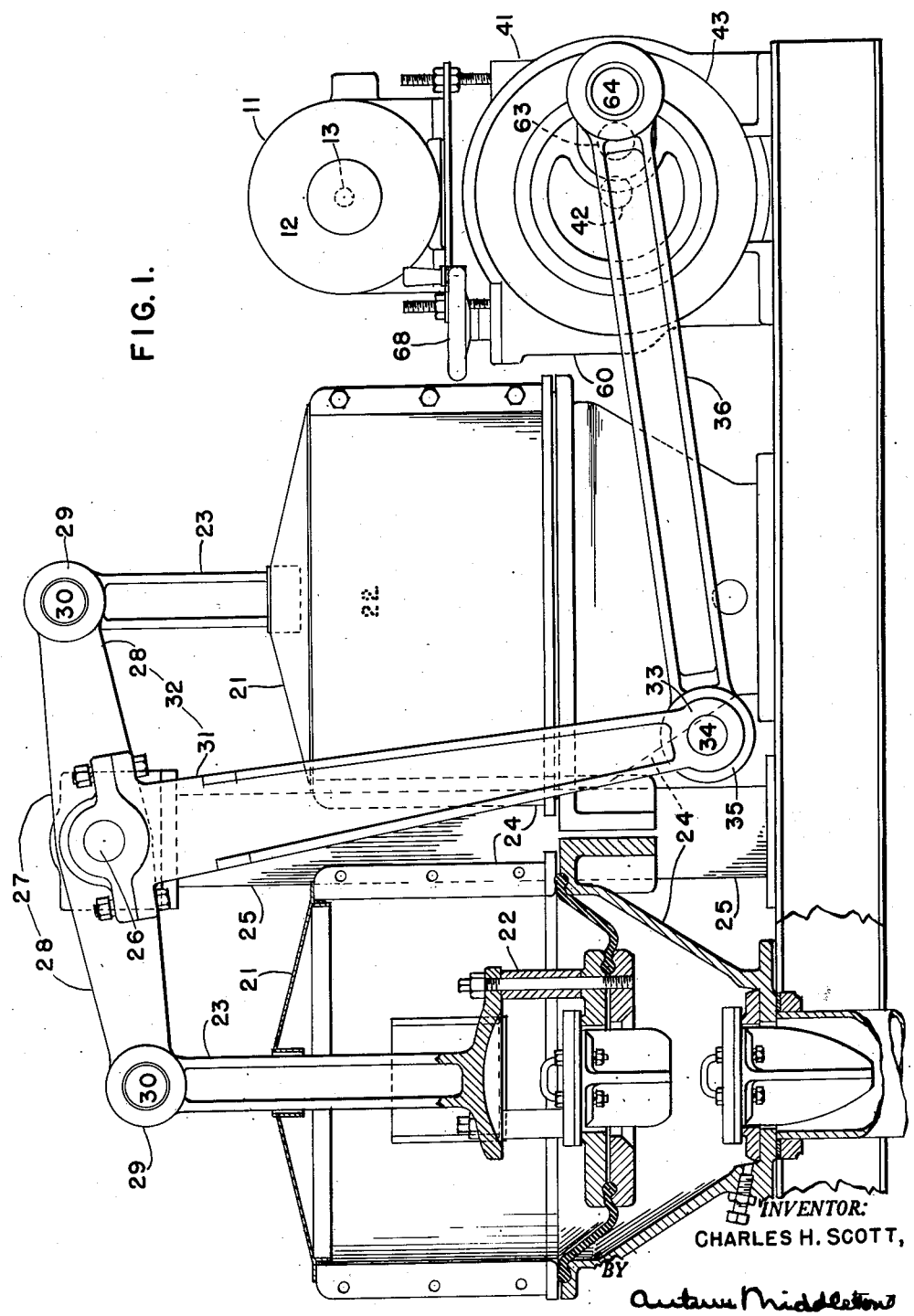

Reference is now made to the drawings in detail:

Source of operating power 11 indicates an electric motor for serving as a source of operating power. This motor has a driven rotor 12 and a rotor shaft 13 from which power is transmitted to the means to be actuated therefrom. In the instance at hand, the means to be directly actuated from the motor is the power transmission mechanism 41 embodying the invention hereof. This power transmission mechanism has a drive shaft 42 (see Figs. 1, 2 and 4) provided by a member that is actuated from the rotor shaft 13 through any suitable means (not shown), but in this connection it will be noted and is manifest that any suitable means for accomplishing the driving of shaft 42 from the rotor shaft 13 can be employed. For example, such means might involve gearing or pulleys and belts functionally interposed between shafts 13 and 42 just mentioned.

*Apparatus having an actuatable element to be reciprocated within selected ranges of movement*

21 indicates a duplex pump shown partially in vertical section and partially in elevation. This pump is used to typify an apparatus or piece of equipment with respect to which the power transmission mechanism 41 can be advantageously employed to transmit power from the motivating source on the one hand, as for example, from the shaft of an electric motor, when the power transmission mechanism is driven thereby, to a reciprocatable functioning element on the other hand, as for example, to a movable actuated element of a pump or other type of apparatus or equipment.

As to the pump 21, this has reciprocatable or actuatable pump elements 22, 22, movable up and down, each of which has an upwardly extending pump rod or member 23. The pump has a casing or pump body 24 and fixedly associated therewith is a shaft-supporting member 25 upon which there is mounted a rocker shaft 26. A rocker beam 27 is mounted on the rocker shaft and provides outwardly extending arms 28, 28 to the outer or free end 29, 29 of which there are pivotally connected at 30 the upwardly extending rods 23 of the reciprocatable pumping elements 22, 22.

An actuated swinging arm 31 is also mounted upon this shaft. This actuated arm is either directly or indirectly connected to the rocker beam 27 whereby the outwardly extending arms of the latter in conjunction with the actuated arm in effect provides a T or double bell crank construction collectively designated 32 and whereby consequent to the reciprocating of the swinging arm 31 there is imparted to the rocker beam 27 the movements proper for the pump elements 22, 22. To the lower or free end 33 of the actuated swinging arm 31 just referred to, there is connected at 34 one end 35 of the link 36, the other end of which link is connected to the crank pin 64 of a longitudinally extending crank shaft 63 mounted and actuated so as to be turnable about its own axis and also so at the same time as to be bodily movable about a main longitudinal axial line 1—1 (see Fig. 4) with respect to which the shaft axis 2—2 always continues parallel but from which main axial line the crank shaft axis is always located at a constant lateral or radial distance.

The mechanism that includes the rocker shaft 26, the rocker beam 27, the actuated swinging arm 31 and the link 36 is sometimes collectively referred to herein as a linkage mechanism by which the reciprocatable or reciprocating guided elements, to wit, elements such as reciprocatable pumping members are actuated by and from the crank shaft 63.

The reciprocatable pumping elements are employed as an illustrative example of any one of diverse types of reciprocatable guided elements which may be actuated from a suitable source of power through the medium of a power transmission mechanism embodying the invention hereof.

*Mechanism for transmitting from the rotary driving element reciprocating movements within selected operating ranges*

The power transmission mechanism 41 comes under this heading and embodies or comprises:

1. The drive shaft 42 referred to which is herein described as having a drive pinion 91 at the forward end thereof and as being turnable about the main axial line 1—1.

2. A frame structure or housing casing collectively designated as 43.

3. A large internal gear 54 supported in said housing structure so as to be angularly adjustable about said main axial line 1—1, but normally held or locked in a fixed or set adjusted position therefor.

4. A gear position and locking means collectively designated as 60 carried by the housing and functionally engaging said large internal annular gear.

5. A combined crankshaft carrier and gear cage 71 herein referred to as combined carrier and cage mounted in bearings provided in said housing and turnable about said main axial line 1—1.

6. A crankshaft 63 having an axial center eccentrically mounted in said composite carrier and cage in a manner whereby the axial center of the crankshaft parallels but is laterally positioned with respect to the main axial line and so that as the composite carrier and cage turns about the main axial line, the crankshaft has a bodily planetary type of movement about the main axial line 1—1; and 7. An epicyclic train of gears mounted on said combined carrier and cage of which one spur gear 92 of the train is driven from the drive pinion or gear 91 of drive shaft 42, of which another driven spur gear 94 is carried by and in turn drives the crankshaft 63, while another pinion 95 (associated with the last mentioned spur gear 94 and therewith constitutes a unitary gear element) meshes with the large internal annular gear 54.

*Frame structure 43*

The housing casing 43 which when constructed as shown has:

(a) A hollow longitudinally-extending body member 44 open at each end with a large circular bearing 45 provided therein for receiving the exterior bearing portion of the internal annular gear 54, or positionable control gear as said gear may be called, a lateral opening or apertured portion 46 for receiving a gear positioning and locking means 60 for angularly positioning said annular gear about a longitudinally-extending axis of said gear and for holding said gear in a selected or adjusted position therefor and a normally covered access opening 47 through the body member in the immediate region of said circular bearing 45. The cover for the opening is designated 40.

(b) A front ring or bearing member 48 detachably secured as by bolts 49 to the front end of the body member. This bearing member has an opening extending therethrough which is circular in transverse section and as thus constructed provides a stationary or non-turnable large front circular bearing or hollow bearing element 50 for receiving and guidingly supporting a turnable circular bearing or bearing element 72 provided on a transversely-extending front portion of the combined crankshaft carrier and gear cage 71. The circular bearing member 72 provided at and for the front end of the combined crankshaft carrier and gear cage 71 is sometimes herein referred to as the main and front turnably supported bearing member of and for the gear cage 71. When the front or non-turnable bearing member 48 is in place the stationary front large circular bearing 50 thereof is concentric with the aforementioned circular bearing or hollow bearing element 50 thereof is concentric with the aforementioned circular bearing 45 for the angularly positionable angular gear 54, the axial center of which large hollow circular bearing or bearing element 50 determines the required location of that which is herein referred to as the longitudinally-extending main axial line 1—1 and about which certain important parts of the power transmission mechanism have bodily orbital movement.

(c) A rear housing cover or non-turnable bearing member 51 is detachably but fixedly secured by bolts 52 to the rear end of the body member 44; this rear non-turnable bearing member 44 has an opening extending longitudinally therethrough which is circular in transverse cross-section and provides a rear hollow circular bearing member 53 concentric with the aforementioned large circular bearings 45 and 50. The rear circular bearing 53 as thus provided is disposed for receiving or for guidingly supporting a rear circular bearing portion or turnable rear bearing element 73 of the combined crankshaft carrier and gear cage 71; and (d) A housing rearmost cover cap 86 is detachably secured in place through the medium of bolts 87. This cover cap 86 has a receiving space for an oil-sealing means 88 provided at 89 between the cap on the one hand and the drive shaft 42 on the other hand.

*Large internal annular gear 54*

This internal gear which is angularly positionable about the main axial line is provided for controlling the resulting movements of the crank pin. This gear has an annular body 55 from which there inwardly extend teeth 56 which are arranged along the interior of said body. Circular outer bearing portions 57 are provided at and along the outer side or edge portions 58 of the annular body. These circular bearing portions 57 have sliding fitting engagement with the large hollow circular bearing 45 provided on or at the interior front portion of the hollow body member 44 of the frame structure. The internal annular gear 54 also has arranged and disposed along the circular exterior thereof a series of worm-engaged teeth 59 which have fitting engagement with the thread portions 62 of the worm 61 of that which has heretofore been referred to as a part of the gear position or locking means collectively designated as 60.

*Gear positioning and locking means 60*

Figure 5:
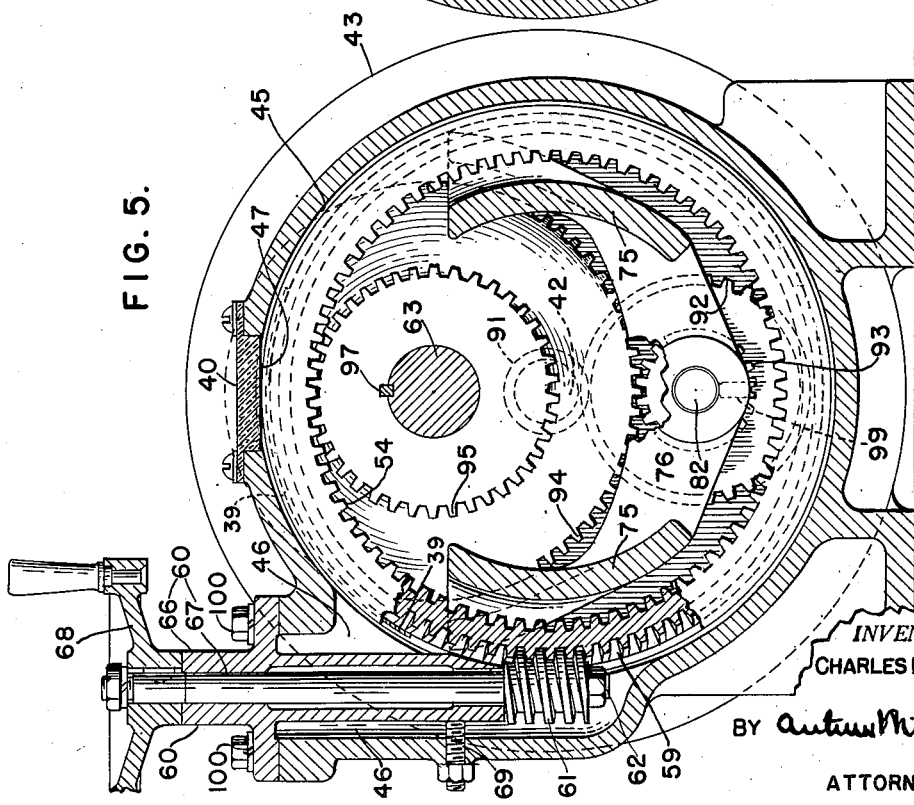
Fig. 5 is a vertical transverse sectional view of which a section thereof is taken as on a vertical plane indicated by line 5—5 of Fig. 4 looking in the direction of the arrows 5—5.
Figure 7:
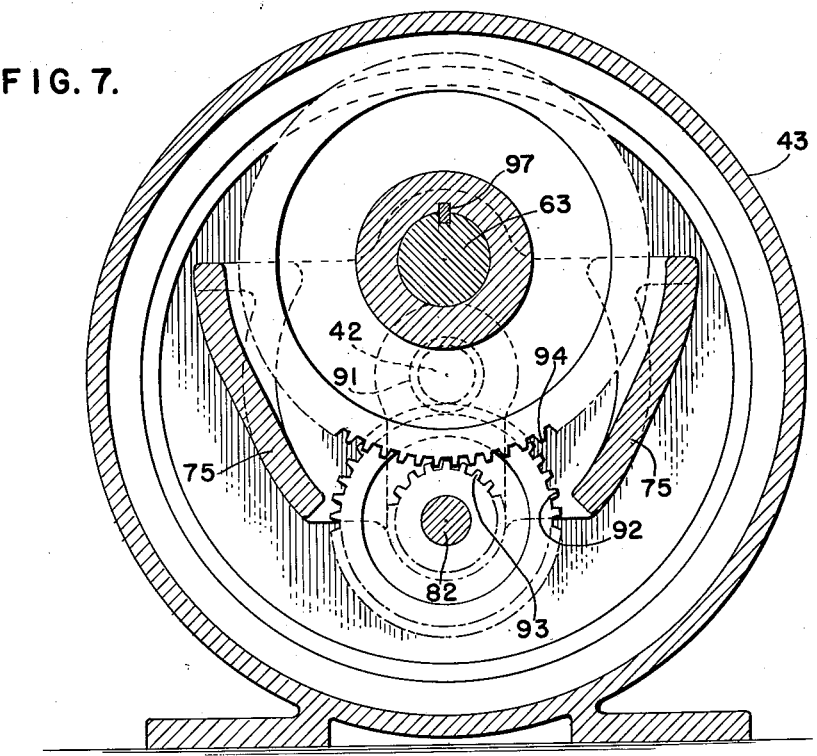
Fig. 7 is a vertical transverse sectional view taken as on vertical planes indicated by broken line 7—7 of Fig. 4 looking in the direction of the arrows 7—7 of Fig. 4.

This means 60, according to showing in Fig. 5, includes the worm 61 located so that the screw-threaded portion 62 thereof engages the teeth 59 on the exterior of said internal annular gear 54 whereby, according to the turning of said worm, there can be imparted to the annular gear 54 angular positioning movement about the main axial line 1—1 and whereby the screw-threaded portion 62 of said worm can hold or lock the annular gear in selected angularly adjusted position therefor. This means 60 also includes a removable bearing sleeve 66 through which there extends a shaft 67 actuated by a handwheel 68 at one end and having the worm 61 secured thereto at the other end thereof. The bearing sleeve is detachably secured in place as by bolts 100.

This shaft and worm are positioned so as to assure constant engagement of the threaded portion 62 of the worm 61 with the worm engaged teeth 59 at and along an external peripheral portion of the large internal annular gear 54. A screw 69 with lock nut thereupon is provided whereby the bearing sleeve 66 and shaft 67 carrying the worm 61 can be held in proper position for the worm to serve both as a member for angularly moving the annular gear and also for maintaining the worm 61 in firm locking or holding contact with the worm engaged teeth 59 of the annular gear.

*Combined crankshaft carrier and gear cage 71*

This combined structure 71 embodies:

(a) A front transversely-extending bearing member 72 turnably supported in the circular bearing 50 of the front ring member 48; as previously indicated this member 72 is sometimes referred to as a turnable main front bearing member of and for the gear cage 71;

(b) A rear bearing member 73 turnably supported in the rear circular bearing 53 of the rear housing cover 51; as previously indicated this member 73 is sometimes referred to as a turnable tail or rear bearing member of and for the cage 71;

(c) A rear transversely-extending cage member 74 longitudinally spaced from the front transversely-extending bearing member 72 and extending laterally from the rear bearing member 73, but so as to be located within the housing casing;

(d) Transversely spaced longitudinally-extending side members 75, 75 connecting the front transversely-extending bearing member 72 and the rear transversely-extending cage member 74; and (e) An intermediate transversely-extending web member 76 connecting the side members 75, 75 and disposed in spaced relationship with respect to both said front transversely-extending bearing member 72 and said transversely-extending cage member 74.

In connection with this combined carrier and cage member 71, it will be noted:

That all of the members or parts (a) to (e) inclusive are integrally connected into a unitary crankshaft supporting and cage-like structure; that said front transverse bearing member 72 and said transverse rear cage member 74 respectively having aligned crank shaft openings 77 and 78 in bearings that are laterally located or offset or eccentrically located with respect to the main axial line 1—1. That said openings 77 and 78 are provided for receiving the longitudinally extending crankshaft 63 the axial center 2—2 of which parallels the said main axial line 1—1 and is referred to as the crankshaft axis.

That the rear bearing member 73 of the composite crankshaft carrier and gear cage is hollow and provides a circular bearing portion 79 therethrough for receiving the driving shaft 42 referred to. That the transversely extending intermediate web member 76 and the rear transversely extending cage member 74 have aligned openings therethrough, to wit, openings 80 and 81 wherein there is received and held a longitudinally-extending intermediate shaft 82 laterally offset with respect to said main axial line and which shaft serves as a carrier for an intermediate set of gear members comprising a driven gear 92 and associated pinion 93 of lesser pitch diameter than that of the driven gear 92, which said gear 92 and pinion 93 are turnable as a unit.

*Crankshaft 63*

This crankshaft has a crank arm 65 at the front end thereof, the rear face of which crank arm is located substantially immediately ahead of the crankshaft supporting bearing portion 70 of the shaft carrier and gear cage 71 and wherein there is provided and defined the crankshaft receiving and supporting bearing opening 77 of the turnable front transverse bearing member 72 referred to heretofore. From the crank arm 65 there forwardly extends the crank pin 64. The rear or tail end of the crankshaft 63 is turnably mounted in the supporting bearing opening 78 provided therefor on the rear transversely extending cage member 74. The crankshaft 63 may be viewed as and is herein referred to as a cantilever type of shaft particularly since it carries at the front end thereof the crank arm from which there forwardly projects the crank pin 64 that has no form of support therefor beyond the forward end thereof and whereby the only support for the shaft is that which is provided through the medium of the front bearing provided by the front member 72 and a tail support bearing provided by the tail member 74 of the cage construction. In short, it will be appreciated that the crankshaft 63 is subjected not only to torsional strains but also to bending movement strains because of the front end of the crank arm and crank pin extending therefrom. Certain bending strains are always imparted to the forward end of the shaft and have to be absorbed thereby because of the operating loads experienced by the crank pin as it is actuated. Sometimes and for heavy constructions particularly the load imposed upon the crank pin may be enormous and a consequent heavy bending reload is imposed upon the shaft. Moreover, regardless as to the actual load imposed upon the crank pin, there is a tendency to cause a wobbling of the rear end of the crankshaft and a consequent wobbling of the whole mechanism that is turnably mounted in and with respect to the turnable shaft carrier that moves the crankshaft in an orbital path about the main axis of the apparatus.

Epicyclic train of gearing

This train of gearing constitutes an important functioning feature of the power transmission mechanism 41. This train of gearing starts with the intermediate driven gear 92 actuated from the drive pinion 91 at the forward end of the drive shaft 42 and ends with the driven gear 94 on the crankshaft 63. The epicyclic train also includes on the crankshaft the pinion 95 which rolls along within and constantly in mesh with the internal teeth 56 extending inwardly from the body portion 55 of the large internal gear 54, and which gear 54 is held in selected annular position within and with respect to the housing structure.

The gears or gearing elements of the epicyclic train referred to are all mounted on shafts supported by the combined crankshaft carrier and gear cage, namely as the case may be, on either the crankshaft 63 or the longitudinally extending intermediate shaft 82, thus said gear members or gearing elements of the epicyclic train have bodily movement with the cage as the latter turns about the main axial line I—I. More specifically described the epicyclic gear train includes the set of intermediate gear elements 92 and 93 mounted on the intermediate shaft 82 and of which the intermediate gear element 92 just referred to is a spur gear and is the one which is directly driven from the drive pinion 91 on the drive shaft 42 while the intermediate gear element 93 is a pinion of smaller pitch diameter than the gear 92 and drives the spur gear 94 on the crank shaft 63. The two intermediate gear elements 92 and 93 are connected whereby they turn as a unit. A second set of crankshaft gear elements 94 and 95 heretofore referred to are mounted upon and securely fastened to the crankshaft 63 whereby as said gear elements are caused to turn there is imparted to the crankshaft bodily and turning movement. Of said gear elements 94 and 95 the latter member thereof, namely, the spur gear 94, is driven as already indicated through the medium of the intermediate pinion 93. The other gear element of the crankshaft gear set is the pinion 95 which is of less pitch diameter than that of the gear 94 and as to this pinion 95 of the crankshaft gearing set the teeth 96 thereof directly mesh with the teeth 56 on the interior portion of the large annular gear 54. It will be noted that the gear 94 and pinion 95, just referred to, turn as a set and they are fixedly connected to the crankshaft 63 as through the medium of a key and keyway construction of which the key member 97 thereof is secured in place through the medium of a set screw 98, as will be manifest from an inspection of Fig. 4.

General

Suitable bearings are provided throughout the mechanism whereby the several parts referred to are maintained in the operating position required therefor. While some of these are referred to in a more general way in a subsequent part of the specification, it is sufficient to point out that bearing structures suitable for the purpose required are old and well known and that detailed description of such parts and their functioning is not necessary at this time.

Figure 8:
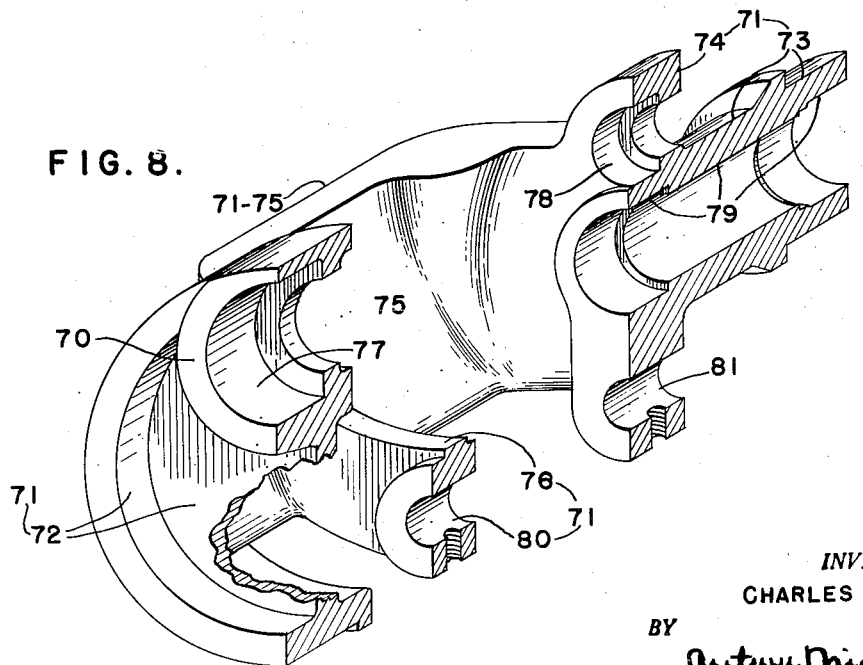
Figs. 8 and 9 are respectively sectional view and plan view partially in section of a combined crankshaft carrier and gear cage employed in the power transmission mechanism.
Figure 10:
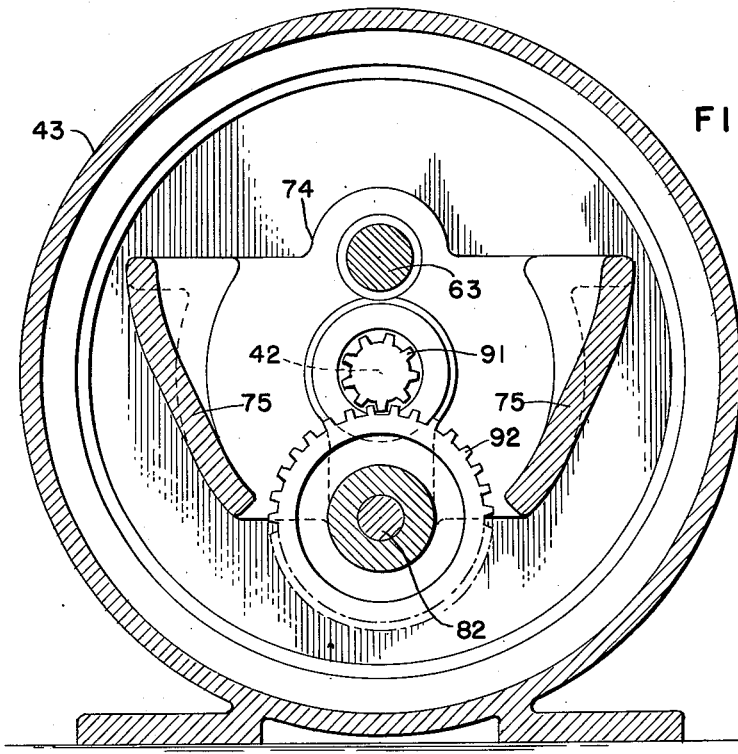
Fig. 10 is a vertical transverse sectional view taken as on the vertical plane indicated by the line 10—10 of Fig. 4 looking in the direction of the arrows 10—10.
Figure 9:
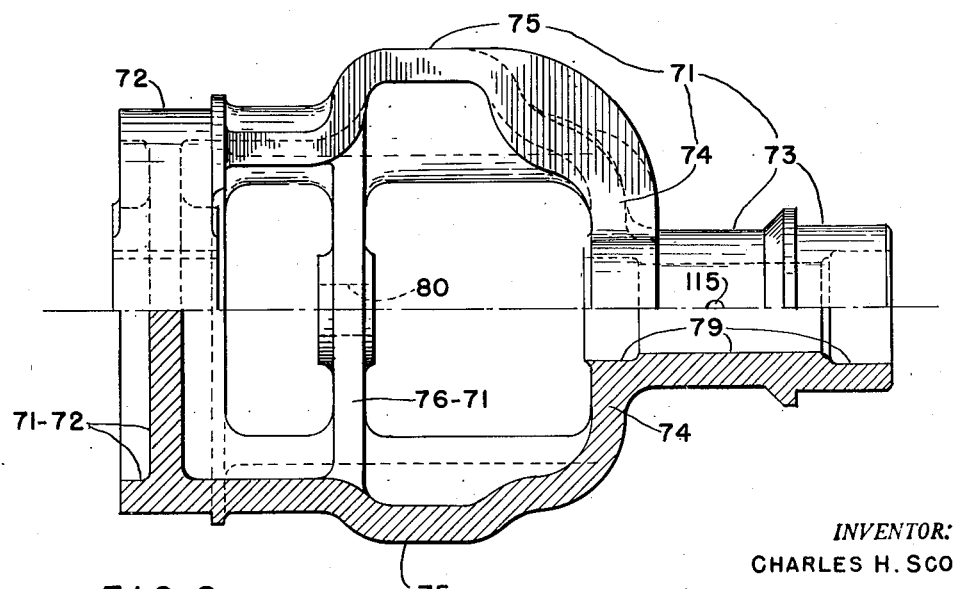

For example, anti-friction bearings are provided at 110 between the shaft carrier construction on the one hand and the crank end portion of the crankshaft 63 on the other hand. Also anti-friction bearings 111 are provided between the tail or rear end portion of the crankshaft 63 on the one hand and the rear transverse cage member 74 on the other hand. Also anti-friction bearings 112 and 113 are provided (see Fig. 8 as well as Fig. 4) between the hollow section 79 of the rear bearing portion 73 of the combination crankshaft carrier and gear cage on the one hand, and the driving shaft 42 on the other hand. The type of bearings employed may be selected having regard for the particular type of work with respect to which the power transmission mechanism is to be employed.

Suitable provision should be made for oiling bearings, as for example, an oiling device 114 or oil holes as at 115. An access opening is provided at 47 in the frame structure 43. This access opening is normally covered by plate 40 of transparent material such as Lucite. Immediately below the plate 40 and observable therethrough there is a stroke indicator plate 39 of suitable strip material, such as zinc, mounted on and movable with annular gear 54. It will also be pointed out that the intermediate shaft 82 may be secured in place in any suitable manner as through the medium of set screws 99.

Respecting the operation of the power transmission mechanism

Now assuming that the drive shaft 42 and its associated drive pinion 91 or externally toothed drive gear as this number 91 is sometimes referred to are turning in a general forward direction whereby there follows a consequent turning of the intermediate gear 92 and associated pinion 93 and from the latter of which there is imparted turning movement to the gear 94 and its associated pinion 95 which as a set is connected to the crankshaft 63. The movement imparted to the crankshaft 63 from the pinion gear 91 on the drive shaft to the gear 94 on the crankshaft is a turning movement of the crankshaft about the axis 2—2 thereof. Furthermore, the turning and bodily movement of the pinion 95 which may be viewed as having a positive rolling engagement with the internal teeth 56 of the large internal annular gear 54 is a general turning movement of the combined crankshaft and gearing cage about the main axial line 1—1 and a consequential bodily orbital movement of the crankshaft 63 and parts thereof or carried thereby about the main axial line 1—1.

In connection with the mechanism as shown, it will be pointed out that the effective radial length of the crank 64, namely, the distance indicated by the line 2—3 which is a distance from the longitudinal center 3—3 of the crank pin 64 to the crankshaft axial line 2—2, is equal to the radial distance indicated by the line 1—2 from the main axial line 1—1 to the crankshaft axial line 2—2. The pitch diameter of the internal teeth 56 of the large internal gear 54 is four times the radial distance 1—2 from the main axial line 1—1 to the crankshaft axial line 2—2 and the pitch diameter of the teeth 96 of pinion gear 95 is one-half of the pitch diameter of the internal gear teeth 56, or as otherwise expressed, twice the effective radius length 1—2.

With this proportion of diameter and effective crank radius equal to radius length 1—2, there is imparted to the crank pin 64 a straight line movement back and forth in a set path just so long as the internal annular gear 54 is held in a fixed position. An annular positioning of this large internal gear 54 can be employed to change the position of the path of movement of the crank pin as from a horizontal path of movement to a vertical or to any selected path of movement between these extremes.

It will thus be seen that by proper positioning of this large internal gear and holding it in a selected position, there can be imparted to a link member actuated from the crank practically any selected degree of movement from a full throw for the actuated member to practically a zero throw therefor. If one desires to have imparted to the crank pin something other than a straight line movement, this can be attained by changing the effective length of the crank, namely, making the crank so as to have an effective length other than that of unity, unity being determined by the length of radial line 1—2.

Figure 4:
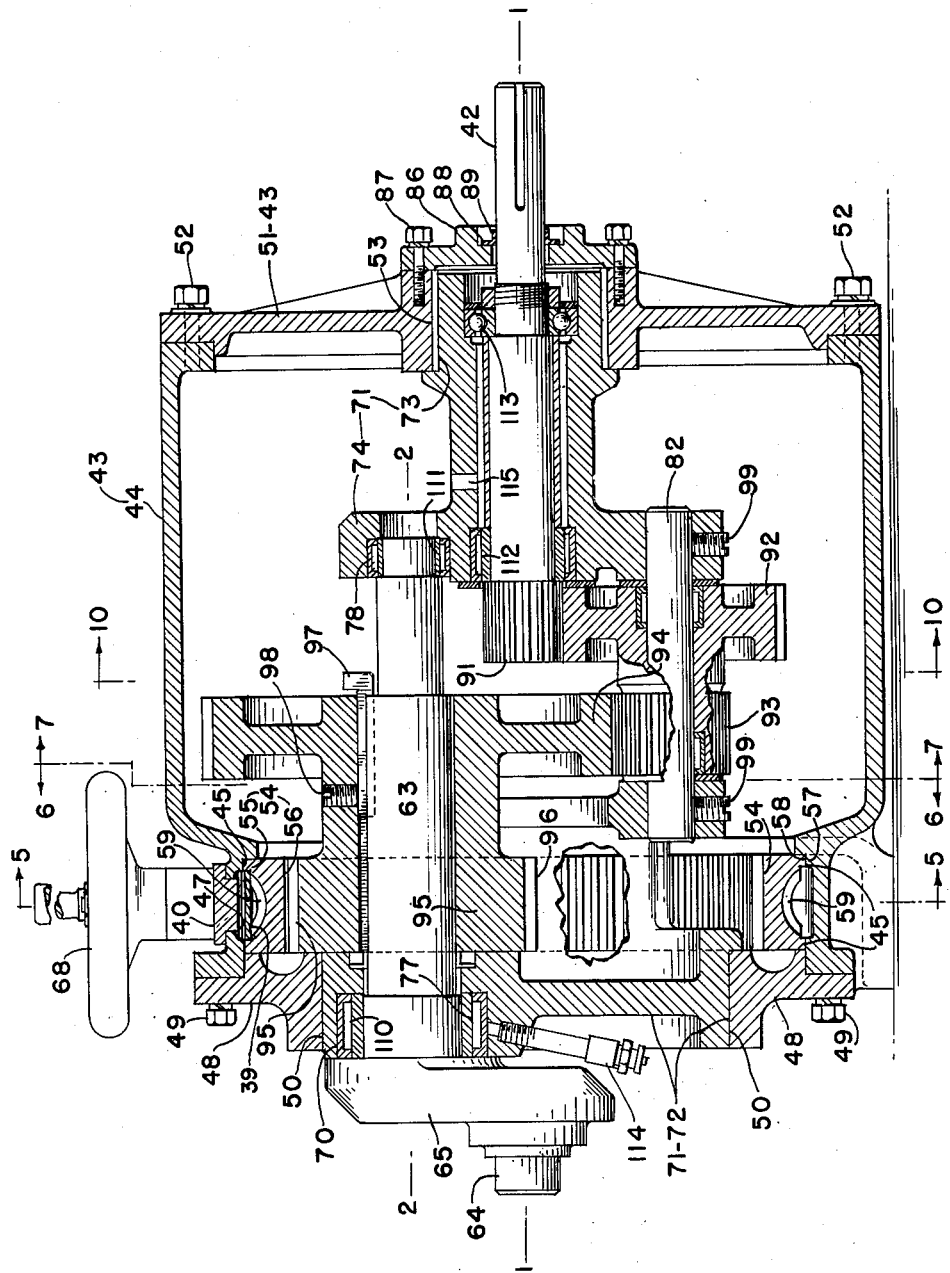
Figure 6:
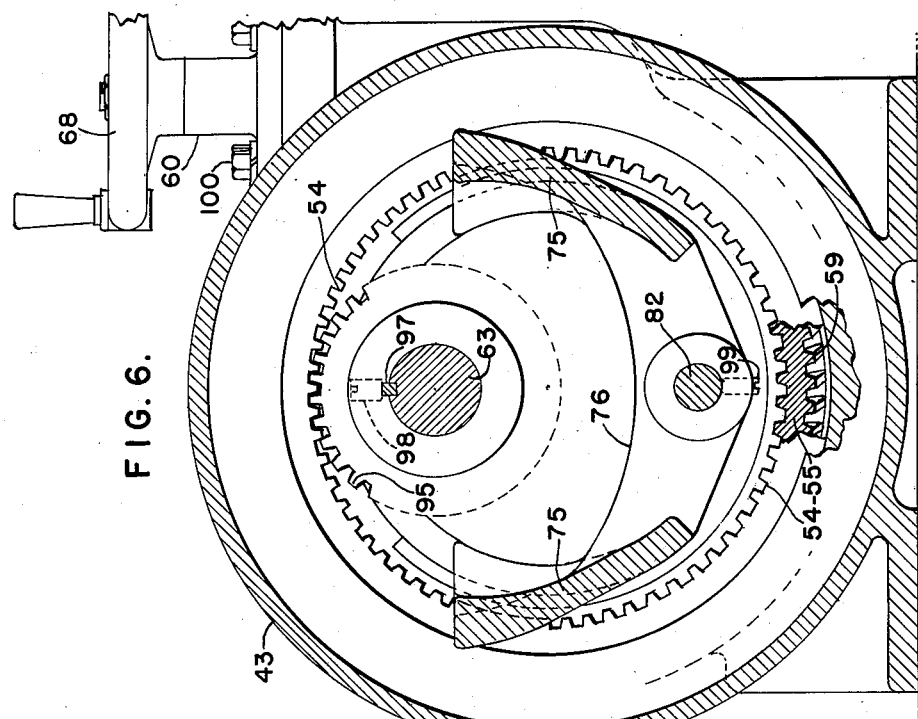
Fig. 6 is a vertical transverse sectional view taken as on vertical planes indicated by the broken line 6—6 of Fig. 4 looking in the direction of the arrows 6—6.

In connection with the construction shown and particularly from an inspection of Fig. 4, it will be seen that the crank is positioned immediately ahead of the bearing member supporting that portion of the crankshaft in the immediate region of the crank. This is an important feature of construction in that it avoids any long cantilever effect on the crankshaft unit from the point of support for the crankshaft on the one hand and the bearing portion of the crank pin on the other. Moreover, the movable element supporting the crank shaft has bearings therefor in radial alignment with respect to the bearing portions supporting the shaft.

Another way of expressing an important feature of the invention is to say that the turnable combined crank carrying member and gear cage provides a main front crank shaft supporting and carrying member 72 which is directly supported in the front fixed bearing 50 of the housing structure, that the crank shaft is eccentrically mounted in the offset crankshaft bearings provided in crank carrying and gear cage member 71 of which the front crankshaft supporting and carrying member 72 constitutes an important part; that the crank arm is located immediately ahead of this last mentioned member 72 and that the gearing connected to the crankshaft is behind said member 72. The result of this arrangement is the avoidance of any considerable cantilever overhanging of the crank arm from the front bearing support for the crankshaft as provided by said member 72 and a relatively direct support for the load as transmitted from the crank 64 to the crankshaft and thereby directly to the stationary front bearing 50 provided at the front end of the housing structure.

I claim:

1. A power transmission mechanism of the class described, comprising in operative combination a main structure embodying a front portion providing a stationary hollow circular main bearing element the axial center of which extends longitudinally and thereby determines the location of a main axial line; an internally-toothed annular gear mounted on said main structure so as to be concentric with said main axial line and also at a location rearwardly with respect to said hollow circular main bearing element; means for holding said annular gear in angularly adjusted position therefor with respect to said main structure; a shaft carrier turnably mounted and supported with respect to said structure and having a forwardly extending portion serving as turnable circular main bearing element that is operatively disposed within said stationary hollow main bearing element of the main structure; means for imparting turning movement to said shaft carrier about said main axial line; a longitudinally-extending crankshaft turnably mounted in and with respect to said carrier and in a position laterally offset with respect to said main axial line; a crank having a body portion carried by and extending laterally from the front end of said shaft and having a crank pin extending longitudinally and forwardly from the free end of said body portion; a pinion carried by and drivingly connected to said crankshaft and rearwardly disposed with respect to said hollow main bearing element and also located in a position such that the teeth of the pinion have constant operative engagement with the internal teeth of the aforementioned annular gear whereby there is imparted turning movement to said crankshaft about its own axial line as said carrier is turned about said main axial line; said power transmission mechanism being characterized in that the main structure embodies not only a front portion providing the aforementioned stationary hollow circular main bearing element but also a longitudinally spaced rear portion providing a stationary rear circular bearing element concentric with said main axial line and an intermediate portion providing a stationary intermediate circular bearing element concentric with said main axial line and upon which said internally-toothed annular gear is positionably mounted; said transmission being characterized by the turnable carrier for the crankshaft being in the form of a cage construction embodying a transversely-extending forward end cage member, a transversely-extending rear end cage member longitudinally spaced from the aforementioned transversely-extending forward end cage member, and longitudinally-extending means integrally connecting the aforementioned transversely-extending forward end and rear end cage members and of which last-mentioned members the transversely-extending front end cage member provides the previously mentioned forwardly-extending portion serving as the turnable front bearing element mounted in and on the front stationary hollow circular bearing element and of which the transversely-extending rear end cage member has a rearwardly disposed circular portion providing a rear supported bearing element turnably mounted on the aforementioned rear stationary circular main bearing element; and also further characterized by the transversely-extending front cage member and the transversely-extending rear cage member of the turnably mounted shaft carrier having shaft supporting bearing portions respectively providing a front end bearing element and a rear end bearing element for the crankshaft of which the front end bearing element is essentially of a character through which the crankshaft extends and within which it is located while the rear end of the crankshaft has guiding and steadying support because of the cooperating rear supporting bearing portion provided on the rear transversely-extending cage member.

2. A power transmission mechanism according to claim 1, wherein the crankshaft has secured thereto gearing embodying the pinion mentioned in the aforesaid main claim and a gear of larger pitch diameter than that of said pinion and connected so as to turn with the pinion; wherein there is a longitudinally extending idler shaft; wherein the turnable carrier serves as a gear cage and embodies longitudinally spaced transversely extending portions providing bearings for holding said longitudinally extending idler shaft the axial center of which is laterally disposed with respect to the axis of the crankshaft and parallels the latter; wherein there is in mesh with said last mentioned gear an idler pinion carried by said idler shaft and an intermediate gear connected with the idler pinion; wherein said rear end of the carrier has a circular bearing portion aligned with the main axial line; wherein there is a driving shaft through the last mentioned bearing portion; and wherein a drive gear which is connected to the driving shaft is disposed in driving engagement with the last-mentioned intermediate gear.

3. A power transmission mechanism according to claim 1, having a gear connected so as to turn with the pinion mentioned in the aforesaid main claim and bodily movable therewith in an orbital path about said main axial line; a longitudinally-extending intermediate shaft laterally disposed with respect to the axis of said crankshaft and said main axial line; longitudinally-spaced transversely-extending portions provided on said carrier and having longitudinally-spaced bearing for receiving said intermediate shaft; an intermediate pinion and an intermediate gear mounted on said intermediate shaft and turnable as a unit about the axis of said shaft and of which the intermediate pinion is in meshing engagement with the gear of said crankshaft; a driving shaft aligned with the main axial line and extending through a rear portion of the carrier; and a pinion connected to and driven by said drive shaft and disposed in driving meshing engagement with said intermediate gear.

4. A power transmission mechanism of the class described, comprising in operative combination a main structure embodying a front portion providing a stationary hollow circular main bearing element the axial center of which extends longitudinally and thereby determines the location of a main axial line; an internally-toothed annular gear mounted on said main structure so as to be concentric with the said main axial line and also at a location rearwardly with respect to said hollow circular main bearing element; means for holding said annular gear in angularly adjusted position with respect to said main structure; a shaft carrier turnably mounted and supported with respect to said structure and having a forwardly-extending portion serving as turnable circular main bearing element that is operatively disposed within said stationary hollow main bearing element of the main structure; means for imparting turning movement to said shaft carrier about said main axial line; a longitudinally-extending crankshaft turnably mounted in and with respect to said carrier and in a position laterally offset with respect to said main axial line a distance equal to one-quarter of the length of the pitch diameter of the internal gear; a crank having a body portion carried by and extending laterally from the front end of said shaft and having a crank pin extending longitudinally and forwardly from the free end of said body portion, the longitudinal center of which said crank pin is laterally spaced from the axis of said crankshaft a distance equal to that of the distance which the axis of the crankshaft is laterally offset with respect to said axial line; a pinion carried by and drivingly connected to said crankshaft and rearwardly disposed with respect to said hollow main bearing element and also located in a position such that the teeth of the pinion have constant operative engagement with the internal teeth of the aforementioned annular gear whereby there is imparted turning movement to said crankshaft about its own axial line as said carrier is turned about said main axial line; said power transmission mechanism being characterized in that the main structure embodies not only a front portion providing the aforementioned stationary hollow circular main bearing element but also a longitudinally spaced rear portion providing a stationary rear hollow circular bearing element concentric with said main axial line, and an intermediate portion providing a stationary intermediate circular bearing element concentric with said main axial line and upon which said internally-toothed annular gear is positionably mounted; further characterized by having the turnable carrier for the crankshaft in the form of a cage construction embodying a transversely-extending front end cage member, a transversely-extending rear end cage member longitudinally spaced from said front end cage member and longitudinally-extending side members integrally connecting the aforementioned transversely-extending front end and rear end cage members and of which said transversely-extending front end cage member provides a forwardly-extending portion serving as the aforementioned turnable main bearing element heretofore described as mounted in and on the aforementioned stationary hollow circular main bearing element and of which the rear end cage member has a rearwardly-extending tubular portion providing a quill shaft serving as a rear bearing element that is turnably mounted in and on the aforementioned rear stationary hollow circular bearing element; also by having the transversely-extending front end cage member and the transversely-extending rear end cage member with crank shaft supporting bearing portions respectively providing a front end bearing element and a rear end bearing element for the crank shaft of which the front end bearing element is essentially of a character through which the crankshaft extends and within which it is located while the rear end of the crank shaft has guiding and steadying support because of the cooperating rear supporting bearing portion provided therefor on the transversely-extending rear end cage member; and also by having means for imparting turning movement to the carrier include as a part thereof a drive shaft which extends inwardly within and through the quill shaft.

5. A power transmission mechanism according to claim 1, further characterized in that the stationary rear bearing element of the main structure is hollow in that the turnable rear bearing element of the shaft carrier is provided by a quill shaft turnably mounted in and on said stationary bearing element; in that there is a drive shaft extending inwardly through and mounted within the quill shaft and having at the forward inner end thereof a drive pinion; and in that the means for imparting turning movement to the shaft carrier includes a gear mechanism having as a part thereof a member which is actuated by said drive pinion and also a gear member which in turn engages and turns the pinion on the crankshaft.

6. A power transmission mechanism of the class described, comprising in operative combination a main structure providing longitudinally-spaced supporting bearing elements, of which one is a stationary front hollow circular bearing element, another is a stationary rear circular bearing element and another is an intermediate bearing element, all of which bearing elements are in axial alignment and determine the location of a longitudinally-extending main axial line; an internally-toothed annular gear mounted on and angularly positionable with respect to said intermediate bearing element; means for holding said internally-toothed annular gear in adjusted position with respect to said main structure; a crankshaft carrier mounted in said housing for turnable movement about said main axial line and embodying a forwardly-extending front circular bearing member located in said front hollow circular main bearing element and embodying a rear bearing member turnably engaging and guidably supported by the rear circular bearing element; a combined crank and crankshaft embodying a longitudinally-extending cantilever type of shaft of which a body portion is carried by and extends laterally from the front end of the shaft and carries a crank pin extending longitudinally and forwardly from the free end of the body portion of the crank; said crankshaft carrier having in the turnable front bearing member thereof a shaft-receiving opening providing a front bearing for receiving and supporting that forward portion of the crankshaft which is immediately behind the body portion of the crank and also providing thereby a longitudinally-spaced bearing section for guidably supporting the rear end of the crankshaft, the longitudinally-spaced crankshaft supporting bearing and the crankshaft guiding sections just referred to being located with respect to the main axial line in such manner that when the parts are in assembled position the axial line of the crankshaft is laterally offset with respect to the main axial line and parallels the latter; a pinion fixedly secured to that portion of the crankshaft in the region thereof behind the front bearing of the crankshaft carrier and being connected to said shaft whereby the crank and pinion turn together, the pitch diameter of said pinion being such that there is always meshing engagement between the teeth of the pinion on the one hand and the internal teeth of the annular gear on the other, whereby as and when said shaft carrier is turned about the main axial line there is a positive turning of the crankshaft in an orbital path about the main axial line and this because of the resulting engagement of the teeth of the pinion with the internal teeth of the annular gear; and means for turning said crankshaft carrier about said main axial line.

7. A power transmission mechanism of the class described, according to claim 6, in which the turnable rear supporting bearing element of the crankshaft carrier is provided by a hollow quill shaft; in which the driving means for imparting turning movement to the crankshaft carrier embodies a drive shaft extending within and through the hollow quill shaft that is turnable within and with respect to the quill shaft and having at the forward end thereof a drive gear; in which the crankshaft carrier and cage has means for supporting thereupon and so as to be movable therewith a set of speed reducing and power transmission gear elements and in which said set of gearing elements is driven from and by the drive gear at the forward end of the drive shaft; and in which a gear member of said gear elements has meshing and driving engagement with the pinion on and drivingly connected with the crankshaft.

8. A power transmission mechanism according to claim 1, further characterized in that the positionable internally-toothed annular gear has provided thereupon along a body portion thereof a circularly arranged set of worm-engaged teeth; and also further characterized in that the means for holding the annular gear in angularly adjusted position with respect to the main structure includes a worm gear turnably mounted on said main structure and constructed so that the screw threaded portion of the worm gear has constant fitted engagement with the worm-engaged teeth of the annular gear, and also includes means for turning said worm gear whereby when the latter is actuated the screw threaded portion of the worm gear functions to impart turning movement to the internally-toothed annular gear for positioning the latter but whereby when said worm gear is not being actuated said screw threaded portion thereof functions so as to serve as means for holding the annular gear in adjusted locked position.

CHARLES H. SCOTT.

REFERENCES CITED

The following references are of record in the file of this patent:

UNITED STATES PATENTS

| Number | Name | Date |
|---|---|---|
| 1,898,753 | Wente | Feb. 21, 1933 |
| 2,244,812 | Taylor | June 10, 1941 |
| 2,338,352 | Paque | Jan. 4, 1944 |